(12) United States Patent
Cheng et al.

(10) Patent No.: US 8,953,564 B2
(45) Date of Patent: Feb. 10, 2015

(54) SYSTEMS AND METHODS TO ACHIEVE FAIRNESS IN WIRELESS LANS FOR CELLULAR OFFLOADING

(71) Applicant: FutureWei Technologies, Inc., Plano, TX (US)

(72) Inventors: Ho-Ting Cheng, Stittsville (CA); Osama Aboul-Magd, Kanata (CA); Sheng Sun, Kanata (CA); Junghoon Suh, Kanata (CA); Kwok Shum Au, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 117 days.

(21) Appl. No.: 13/715,649

(22) Filed: Dec. 14, 2012

(65) Prior Publication Data

US 2014/0169339 A1 Jun. 19, 2014

(51) Int. Cl.
*H04W 72/04* (2009.01)
*H04W 74/00* (2009.01)
*H04W 72/10* (2009.01)

(52) U.S. Cl.
CPC ............ *H04W 72/044* (2013.01); *H04W 72/10* (2013.01); *H04W 74/002* (2013.01)
USPC ......... 370/336; 370/328; 370/329; 455/426.1

(58) Field of Classification Search
CPC . H04W 16/14; H04W 28/14; H04W 72/1252; H04W 72/1284; H04W 72/1289; H04W 72/0446; H04W 74/02; H04W 74/06; H04W 74/08; H04W 72/044; H04W 74/002; H04L 12/5695

USPC ......... 370/252, 328, 329, 332, 342, 345, 336; 455/426.1, 509; 375/224
See application file for complete search history.

(56) References Cited

U.S. PATENT DOCUMENTS

| | | |
|---|---|---|
| 2004/0233876 A1 | 11/2004 | Nakashima et al. |
| 2005/0063341 A1 | 3/2005 | Ishii et al. |
| 2006/0221879 A1 | 10/2006 | Nakajima et al. |
| 2008/0259853 A1* | 10/2008 | Ito .................................. 370/329 |
| 2010/0103883 A1* | 4/2010 | Das et al. ....................... 370/329 |
| 2010/0135236 A1 | 6/2010 | Wang et al. |

(Continued)

OTHER PUBLICATIONS

Checco, A., et al., "Proportional Fairness in 802.11 Wireless LANs," IEEE Communications Letters, vol. 15, No. 8, Aug. 2011, pp. 807-809.

(Continued)

*Primary Examiner* — Afsar M Qureshi
(74) *Attorney, Agent, or Firm* — Slater & Matsil, L.L.P.

(57) ABSTRACT

System and method embodiments are included to provide various degrees of time allocation fairness to users using varying target transmission opportunity (TXOP) values. In one embodiment, a method for promoting various degrees of fairness for users in a wireless network includes assigning a target TXOP value for one or more users in the wireless network, wherein the target TXOP value indicates a number of time units for transmissions to be met on average over time by the one or more users, and transmitting the target TXOP value to the one or more users. In another embodiment, a method includes receiving a TXOP value from the wireless network, wherein the target TXOP value indicates a number of time units allocated for transmissions, and transmitting traffic over a plurality of time periods that have an average duration about equal to the number of time units.

24 Claims, 3 Drawing Sheets

(56) References Cited

U.S. PATENT DOCUMENTS

| | | | |
|---|---|---|---|
| 2012/0218983 A1* | 8/2012 | Noh et al. | 370/338 |
| 2012/0243487 A1* | 9/2012 | Wang et al. | 370/329 |
| 2013/0088983 A1* | 4/2013 | Pragada et al. | 370/252 |
| 2013/0223419 A1* | 8/2013 | Ghosh et al. | 370/338 |
| 2013/0235773 A1* | 9/2013 | Wang et al. | 370/311 |
| 2013/0294354 A1* | 11/2013 | Zhang et al. | 370/329 |
| 2014/0071873 A1* | 3/2014 | Wang et al. | 370/311 |
| 2014/0078970 A1* | 3/2014 | Guo et al. | 370/329 |

OTHER PUBLICATIONS

"Part 11:Wireless LAN Medium Access Control (MAC) and Physical Layer (PHY) Specifications," IEEE Standard for Information technology—Telecommunications and information exhange between systems Local and Metropolitan area networks, IEEE Std 802.11, Mar. 29, 2012, 2,793 pages.

International Search Report and Written Opinion received in International Application No. PCT/CN2012/087119 mailed Aug. 29, 2013, 10 pages.

* cited by examiner

SYSTEMS AND METHODS TO ACHIEVE FAIRNESS IN WIRELESS LANS FOR CELLULAR OFFLOADING

TECHNICAL FIELD

The present invention relates to the field of wireless communications, and, in particular embodiments, to systems and methods to achieve fairness in wireless LANs for cellular offloading.

BACKGROUND

Cellular networks based on 3GPP technologies, such as Long Term Evolution (LTE), provide performance assurances to their users with a level of service fairness. For instance, proportional fairness (PF) is one scheme for allocating transmission times for users to provide a balance between performance and fairness. In the PF scheme, users are allocated transmission time according to their respective amounts of traffic. Cellular networks also support offloading some of the cellular traffic, such as data communications or packets, to other wireless networks, such as Wireless Local Area Network (WLANs) or WiFi networks. In offloading scenarios between cellular networks and WiFi networks, the offloaded cellular traffic may share the same WiFi resources with other WiFi traffic. To enhance the use of WiFi technology for cellular network offloading, WiFi networks based on IEEE 802.11 standard need to provide the same or similar level of assurance for users with cellular traffic offloaded to the WiFi infrastructure.

SUMMARY OF THE INVENTION

In one embodiment, a method for promoting various degrees of fairness for users in a wireless network includes assigning a target transmission opportunity (TXOP) value for one or more users in the wireless network, wherein the target TXOP value indicates a number of time units for transmissions to be met on average over time by the one or more users, and transmitting the target TXOP value to the one or more users.

In another embodiment, a network component for promoting various degrees of fairness for users in a wireless network includes a processor and a computer readable storage medium storing programming for execution by the processor. The programming includes instructions to assign a TXOP value for one or more users in the wireless network, wherein the target TXOP value indicates a number of time units for transmissions to be met on average over time by the one or more users, and transmitting the target TXOP value to the one or more users.

In another embodiment, a method for supporting various degrees of fairness in a wireless network includes receiving a TXOP value from the wireless network, wherein the target TXOP value indicates a number of time units allocated for transmissions, and transmitting traffic over a plurality of time periods that have an average duration about equal to the number of time units.

In yet another embodiment, a device supporting various degrees of fairness in a wireless network includes a processor and a computer readable storage medium storing programming for execution by the processor. The programming includes instructions to receiving a TXOP value from the wireless network, wherein the target TXOP value indicates a number of time units allocated for transmissions, and transmitting traffic over a plurality of separate time periods that are on average about equal to the number of time units.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
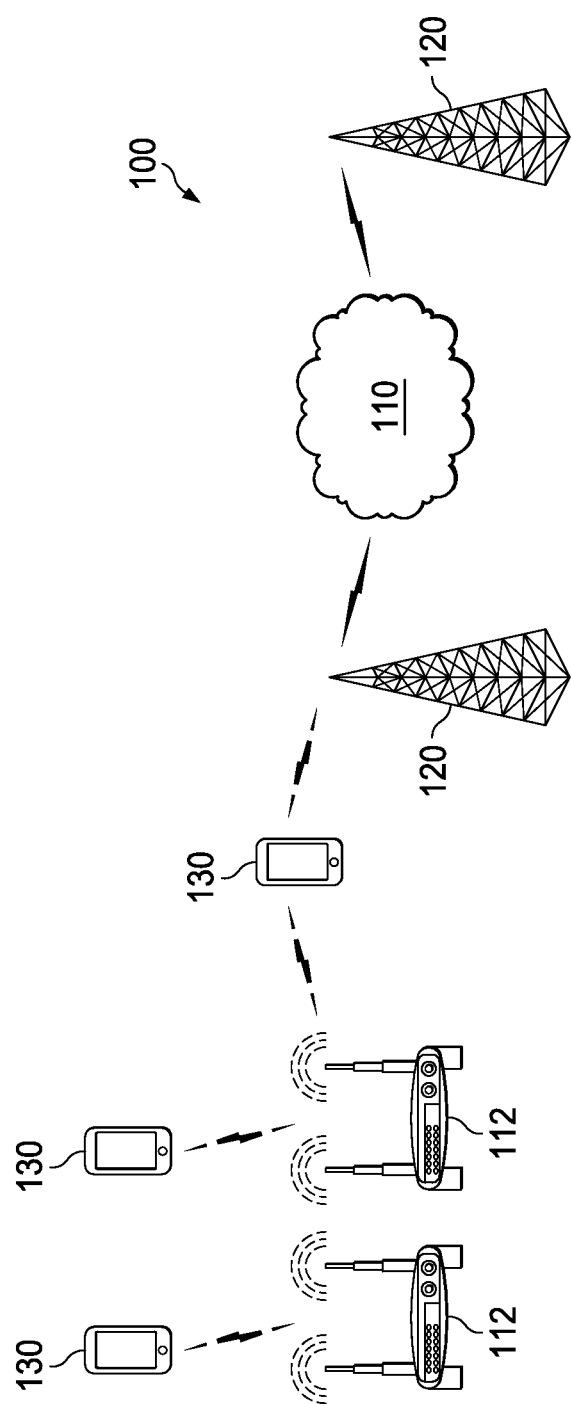
FIG. 1 illustrates an example of a system for cellular offloading.

FIG. 1 illustrates a system 100 for cellular offloading. The system 100 includes a cellular network comprising a core network 110, one or more radio access nodes (RANs) 120, and one or more user equipments (UEs) 130. The cellular network may be any wireless or cellular network, such as an E-UTRAN system, a Global System for Mobile Communications (GSM) system, a General Packet Radio Service (GPRS) system, a Code Division Multiple Access (CDMA) system, an Evolution-Data Optimized (EV-DO) system, an Enhanced Data Rates for GSM Evolution (EDGE) system, other systems, or combinations thereof. The core network 110 may be any network managed by an operator, e.g., a mobile or cellular network operator, and used as a backhaul for the cellular network. For example, the core network may be an operator IP network. The RAN 120 is any base station or wireless radio transmitter/receiver (transceiver) component that provide the UEs 130 wireless access to the core network 110 or the cellular network. For example, the RAN 120 is an E-UTRAN node B (eNB). Each RAN 120 has a coverage range referred to as a cell. The UEs 130 are any mobile user devices that communicate with the RANs within the same cell using wireless or cellular links (indicated by a dashed line). Examples of the UEs 130 include cellular phones and smartphones, computer tablets, and computer laptops that are configured with cellular technology.

The system 100 also includes a wireless LAN or WiFi network based on IEEE 802.11 standard that can be used for offloading cellular network traffic for the UEs 130. The wireless LAN comprises one or more access points (APs) 112 configured to provide the UEs 130 wireless access to the wireless LAN. The UEs 130 are also referred to herein as stations (STAs). The APs 112 comprise wireless or radio transmitters/receivers that communicate with the STAs or UEs 130, e.g., according to the IEEE 802.11 standard. For example, the APs 112 include wireless routers and/or modems, such as IEEE 802.11 modems/routers. The STAs 120 also comprise wireless or radio transmitters/receivers that communicate with the APs 112, e.g., based on the IEEE 802.11 standard. The wireless links between the UEs 130 and APs 112 are indicated by dashed lines. Thus, a UE 130 can communicate with a RAN 120 to exchange cellular traffic (e.g., voice traffic), communicate with an AP 112 to exchange WiFi traffic (e.g., data or Internet traffic), or both. Further, the UE 130 can switch from a cellular link to a WiFi link, via a handoff procedure, to offload cellular traffic from the cellular network to the WiFi network.

According to the IEEE 802.11 standard, transmission time in a wireless LAN or WiFi network can be divided for different traffic using Media Access Control (MAC) super-frames. Super-frames are initiated by the APs 112 and detected by the UEs or STAs 130 to determine the allocated times for different traffic and communicate accordingly within the WiFi network. Each super-frame may include a beacon, a contention-free period (for cellular traffic), and a contention period (for local WiFi traffic). Time allocated to cellular traffic and WiFi traffic may vary from one super-frame to another super-frame. The time division is included in the beacon frame received by all clients, including UEs 130 that communicate with the cellular network and the WiFi network.

Figure 2:
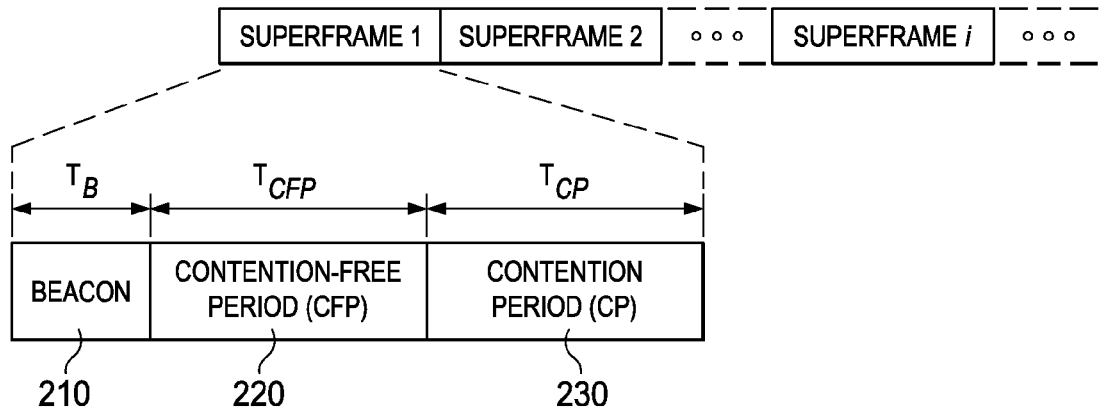
FIG. 2 illustrates a Media Access Control (MAC) superframe for transmission time division and allocation.

FIG. 2 illustrates a super-frame 200 that is transmitted or broadcasted by a WiFi or IEEE 802.11 network to client devices (e.g., STAs or UEs). A super-frame 200 includes a beacon 210, a contention-free period (CFP) 220 for allowing offloaded cellular traffic transmissions, and a contention period (CP) for allowing local WiFi traffic transmissions 230, each occupying one or more octets of the super-frame 200. The network can transmit a plurality of super-frames subsequently as needed, e.g., with varying values.

During the time dedicated for transmitting offloaded cellular traffic in the WiFi network, a level of fairness need to be achieved between associated UEs, i.e., UEs that communicate with a cellular network and that share resources (or links) in the WiFi network. The MAC according to IEEE 802.11 standard guarantees equal transmission opportunities for the different UEs or STAs, e.g., using a max-min transmission opportunity allocation. The system performance using the max-min transmission opportunity allocation scheme is substantially dominated by the worst STA performance. For example, in a scenario where two STAs with the same traffic model have different transmission data rates of 10 Megabits per second (Mbps) and 1 Mbps, the system throughput according to the scheme is close to 1 Mbps (assuming one PDU transmitted each time) due to the intrinsic nature of an exponential back-off mechanism. This may not be fair or efficient to serve the STA with 10 Mbps data rate.

The intrinsic nature of the exponential back-off mechanism can be explained by analyzing a system with one AP and N STAs (N is an integer) and considering a proportional fairness (PF) scheme for allocating transmission time. The fraction of time occupied by STA i is $$\tau_i = \frac{T_i}{\sum_{k=1}^{N} T_k},$$

where $T_i$ is the aggregate amount of time occupied by STA i. The throughput of STA i is calculated as $$S_i(\tau_i) = \tau_i R_i = \frac{R_i T_i}{\sum_{k=1}^{N} T_k},$$

where $R_i$ is the average transmission data rate of STA i. In a publication by A. Checco, A and D. J. Leith, entitled "Proportional Fairness in 802.11 Wireless LANs," in IEEE Communications Letters, vol. 15, no. 8, pp. 807-809, August 2011, which is incorporated herein by reference, the authors showed that in order to achieve PF, every STA needs to occupy the same amount of air time, i.e., $$\tau_i = \frac{1}{N},$$

for all i.

Maximizing the minimum of the air time, i.e., max $\{\min\{\tau_i\}\}$, can also achieve PF at the optimal solution $\tau_i = \tau_j$ for any i, j, which is $$\tau_i = \frac{1}{N}.$$

This shows that the optimal solutions to throughput PF optimization and max-min time allocation are identical.

For PF, since the time spent by each STA is identical, the number of bits each STA can transmit in each transmission opportunity is $L_1$ and $L_2$ (assuming no protocol overhead and single PDU transmissions). Hence, the PF average data rate is $$R^{PF} = \frac{R_1 + R_2}{2}$$

for two STAs with data rates $R_1$ and $R_2$. With the current IEEE 802.11 contention-based MAC, since the number of bits that each STA can transmit in each transmission is identical, the time spent by each STA is $T_1$ and $T_2$. As such, the legacy average data rate is $$R^{legacy} = \frac{2 R_1 R_2}{R_1 + R_2}.$$

Hence, the gain of PF over the existing IEEE 802.11 MAC is $$\frac{R^{PF}}{R^{legacy}} - 1 = \frac{(R_1 R_2)^2}{4 R_1 R_2}.$$

Assuming that $R_1 = 10$ Mbps and $R_2 = 1$ Mbps, with 50% protocol overhead, the gain is about 100%. For N STAs, $$R^{PF} = \frac{1}{N} \sum_{i=1}^{N} R_i,$$

$$R^{legacy} = \frac{N}{\sum_{i=1}^{N} \frac{1}{R_i}},$$

and the gain is $$\frac{R^{PF}}{R^{legacy}} - 1 = \frac{1}{N^2} \left( \sum_{i=1}^{N} R_i \right) \left( \sum_{i=1}^{N} \frac{1}{R_i} \right) - 1 \geq 1 - 1 = 0$$

based on Cauchy-Schwarz inequality. This means that the gain of the PF approach is non-negative. Depending on the purpose of a system, proportional fairness (PF) or max-min fairness time allocation schemes may not be suitable. For example, a degree of fairness between max-min fairness and PF may be more suitable.

System and method embodiments are shown herein to provide more suitable time allocation fairness for STAs (or UEs). The embodiments provide a fairness scheme that can assign different degrees of fairness using varying target transmission opportunity (TXOP) values as described below. The target TXOP values can be selected and assigned to STAs to satisfy PF (as shown above), to satisfy max-min fairness (dominated by the worst STA performance), or to provide pre-determined or desired throughputs for the STAs. For example, if the date rate for a first STA (STA 1) is 10 Mbps and that for a second STA (STA 2) is 1 Mbps, and a throughput ratio of 2:1 is desired (instead of 10:1 in case of PF), then the target TXOP value for STA 2 is 5 times the target TXOP value for STA 1. A target TXOP value can be pre-determined and broadcasted from an AP to its STAs, which then match the target TXOP value on average. Alternatively, each STA can be assigned a TXOP value according to the STA's traffic (e.g., data rate or throughput). In yet another scheme, the TXOP value can be negotiated between the AP and the STA.

Figure 3:
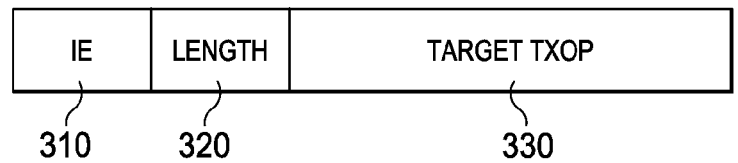
FIG. 3 illustrates an embodiment target transmission opportunity (TXOP) information element (IE).

In an embodiment, the IEEE 802.11 MAC protocol that provides max-min fairness in transmission opportunities is further configured to provide target TXOP values for the STAs. The target TXOP value is added to a beacon frame in a super-frame (e.g., the super-frame 200) as a new field or Information element (IE). An AP can announce or broadcast the target TXOP value in the beacon for its STAs. FIG. 3 illustrates an embodiment target TXOP IE 300 that may be included in the beacon (e.g., the beacon frame 210) of a super-frame. The target TXOP IE 300 comprises an IE field 310, a Length field 320, and a Target TXOP field 330. The IE field 310 is a header, the Length field 320 indicates the length in octets of the target TXOP IE 300, and the Target TXOP field 330 comprises the assigned target TXOP value in time units (e.g., in seconds). The size of the Target TXOP 330 is large enough to guarantee sufficient or required precision.

The value of this target TXOP value can be based on any of a plurality of factors, including but not limited to the data rates of different STAs, throughput, traffic types, loading conditions, mobility patterns, or combinations thereof. In case of PF, the target TXOP value may be based on the performance of the highest data rate STA, assuming a fixed number of transmitted PDUs at a time. For instance, the target TXOP value can be computed as the average number of bits per a fixed number of PDUs divided by an average data rate. Each of the STAs which receive the target TXOP IE 300 tries to maintain the same indicated target TXOP value on average (over time). Maintaining the assigned target TXOP on average over time allows PF-based time allocation. Another method to compute the target TXOP value is calculating the average number of bits per one PDU divided by the average data rate of the lowest data rate STA.

In case some STAs have less data to transmit than that specified by the Target TXOP field 330, the transmission duration can be calculated according to the actual amount of data for transmission by the STAs (e.g., without zero padding), e.g., transmission_duration_i(t)<TXOP_target, where transmission_duration_i(t) is the transmission duration of STA i at time t, and TXOP_target is the target TXOP value announced by an AP. The STAs may also transmit more data than specified by the Target TXOP field 330 if feasible, e.g., transmission_duration_i(t')>TXOP_target, as long as the average amount of transmitted data (e.g., in relative long-term over time) matches the target TXOP value.

Figure 4:
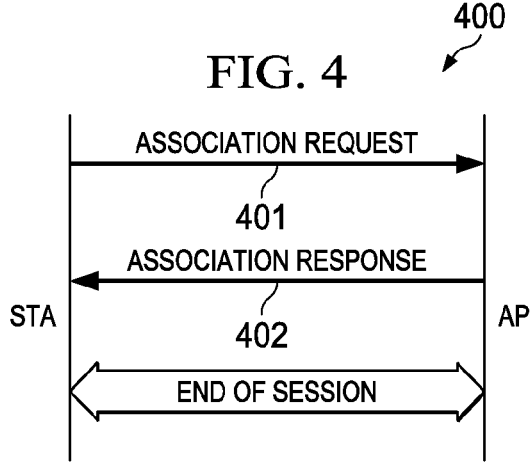
FIG. 4 illustrates an embodiment method for assigning a target TXOP value.

In another embodiment, the network can assign different target TXOP values for different STAs, for instance using the IEEE 802.11 MAC protocol. Assigning different target TXOP values can be implemented in a static manner during the association process between an AP and a STA. FIG. 4 illustrates an embodiment method 400 for assigning a target TXOP value to a STA. At step 401, the STA sends an association request (e.g., a frame) to the AP to join the wireless LAN. The association request may include, among other fields, a requested TXOP value, e.g., in a Target TXOP IE 330. At step 402, the AP returns an association response (e.g., a frame) to the STA including a target TXOP value. The association response includes an assigned TXOP value, e.g., in a Target TXOP IE 330. The assigned TXOP value is then used by the STA for the duration of the session between the AP and STA or until the STA sends a new association request. The assigned TXOP value may be a target TXOP value that is matched on average over time by the corresponding STA.

Figure 5:
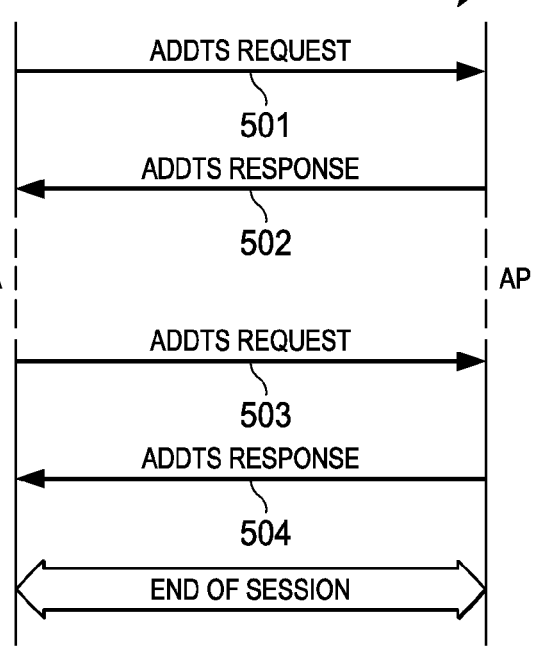
FIG. 5 illustrates another embodiment method for assigning a target TXOP value.

In yet another embodiment, the target TXOP value can be assigned in a dynamic manner anytime during the session. FIG. 5 illustrates another embodiment method 500 for assigning a target TXOP value, where one or more Add Traffic Stream (ADDTS) Request/Response sequences of frames are exchanged between a STA and an AP to negotiate and update if needed a target TXOP value for the STA anytime during a session. The frames may be ADDTS Request/Response frames that are used in IEEE 802.11 to add a traffic stream (TS) with specified Quality of Services (QoS) parameters. The setting of the target TXOP value can be done by the STA or the AP based on different criteria, including expected traffic pattern.

At step 501, the STA sends an ADDTS request to the AP to obtain a target TXOP value. The STA may select an initial TXOP value and communicate the selected value to the AP using a Target TXOP IE in the ADDTS Request frame. At step 502, the AP returns an ADDTS response to the STA to assign a target TXOP value. The AP may grant the STA's requested TXOP value or choose another value based on the STA's expected traffic pattern, for instance as indicated in the Traffic Specification (TSPEC) IE defined in IEEE 802.11-2012. The TSPEC IE can be included in the ADDTS Request/Response frames as an optional IE. The AP may communicate the assigned TXOP value back to the STA using a Target TXOP IE in the ADDTS Response frame. The assigned TXOP value may be a target TXOP value that is matched on average over time by the corresponding STA. This exchange can be repeated multiple times during a session (shown by steps 503, 504 that are respectively similar to steps 501, 502) to reassign dynamically a new target TXOP value as needed. The Target TXOP value can also be indicated as an additional field in the TSPEC IE.

Figure 6:
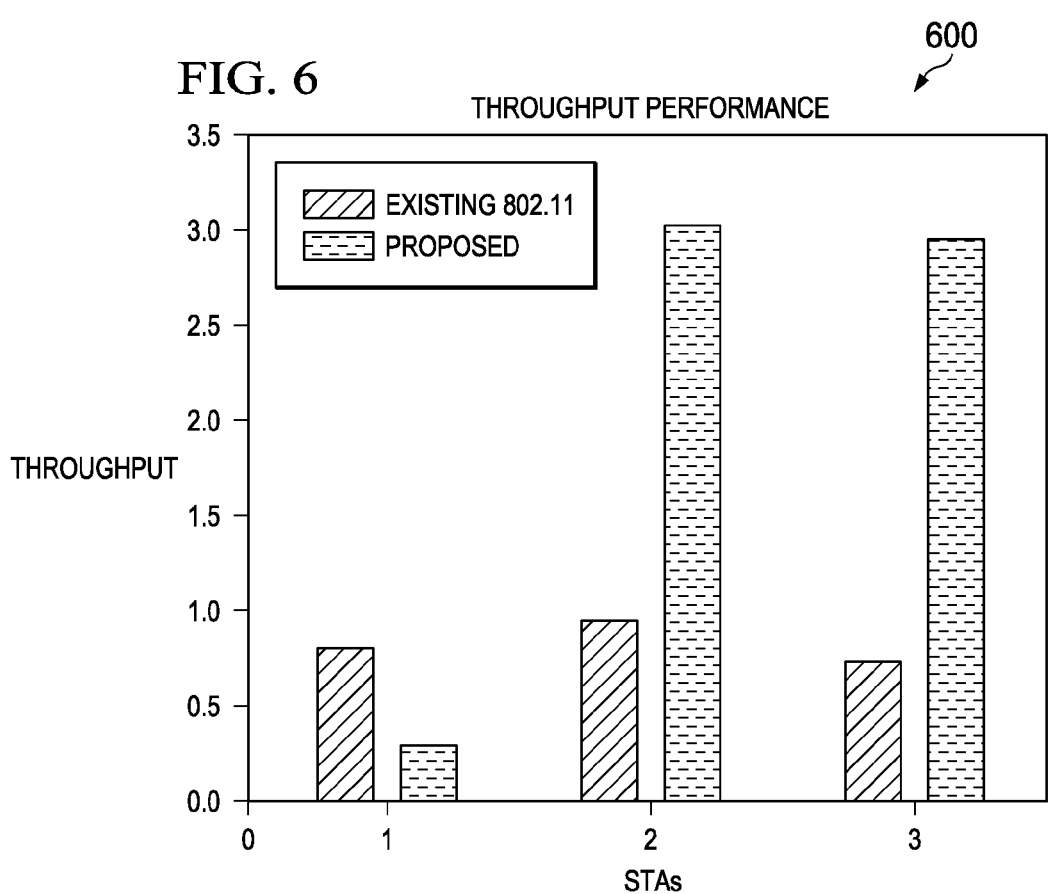
FIG. 6 illustrates simulation results using target TXOP value assignment.

FIG. 6 illustrates simulation results 600 using target TXOP value assignment in comparison to an existing IEEE 802.11 scheme (legacy scheme). The simulation setup includes three STAs: STA 1, STA 2, and STA 3 having link rates: 1, 10, and 10 Mbps, respectively, assuming Poisson distribution for packet arrivals. The simulation time is 10 seconds. The target TXOP value is set based on the time of STA 1 in transmitting one PDU at a time, which is the slowest STA. The other two STAs (2 and 3) can transmit up to 10 PDUs in each channel access if data is available. The throughput performance using target TXOP assignment for the three STAs achieves better system performance in terms of system throughput and fairness. This is shown by the higher achieved throughput for the STAs (2 and 3) with higher link rates.

Figure 7:
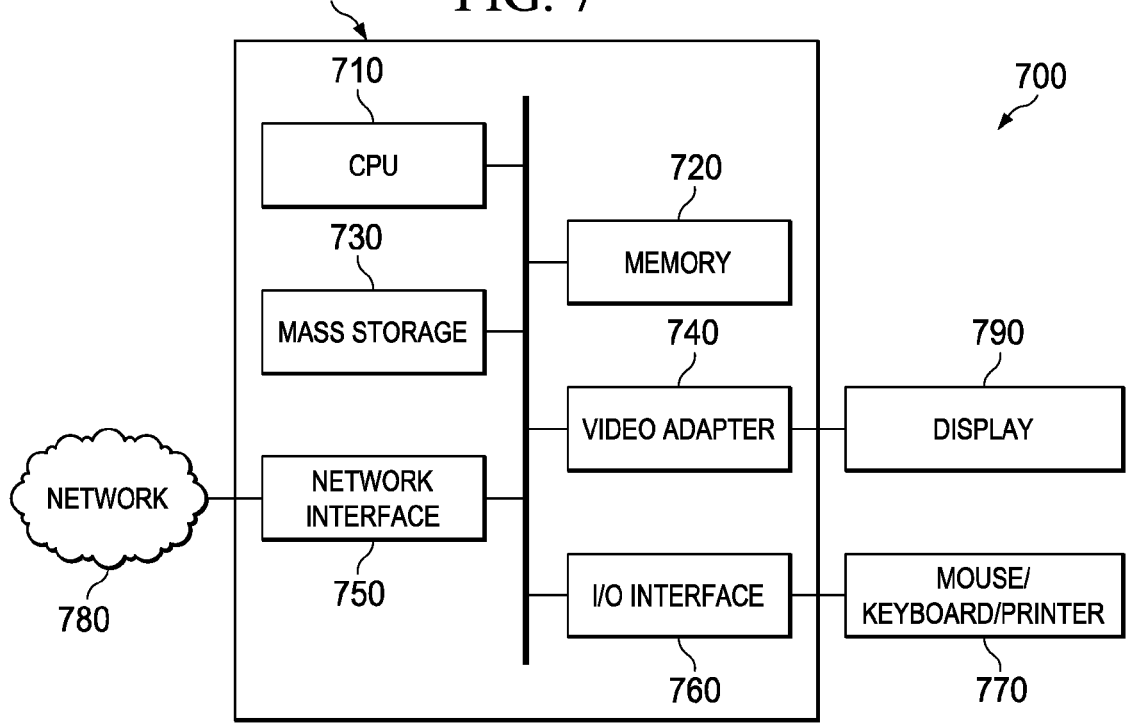
FIG. 7 is a block diagram of a processing system that can be used to implement various embodiments.

FIG. 7 is a block diagram of a processing system 700 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a speaker, microphone, mouse, touchscreen, keypad, keyboard, printer, display, and the like. The processing unit 701 may include a central processing unit (CPU) 710, a memory 720, a mass storage device 730, a video adapter 740, and an I/O interface 760 connected to a bus. The bus may be one or more of any type of several bus architectures including a memory bus or memory controller, a peripheral bus, a video bus, or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The video adapter 740 and the I/O interface 760 provide interfaces to couple external input and output devices to the processing unit. As illustrated, examples of input and output devices include a display 790 coupled to the video adapter 740 and any combination of mouse/keyboard/printer 770 coupled to the I/O interface 760. Other devices may be coupled to the processing unit 701, and additional or fewer interface cards may be utilized. For example, a serial interface card (not shown) may be used to provide a serial interface for a printer.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for promoting various degrees of fairness for users in a wireless network, the method comprising:
assigning a target transmission opportunity (TXOP) value to a mobile station (STA) in the wireless network, wherein the target TXOP value indicates an average number of time units over which the STA is allocated to perform transmissions during a time period, and wherein the target TXOP value allocates transmission opportunities to the STA without allocating specific time units for carrying the transmissions of the STA; and
transmitting the target TXOP value to the one or more users.

2. The method of claim 1, wherein the target TXOP value is transmitted in a target TXOP information element (IE) in a beacon broadcasted from the wireless network to the one or more users.

3. The method of claim 2, wherein the beacon further comprises an IE and a Length field that indicates the size of the target TXOP IE in octets, and wherein the size of the target TXOP IE is sufficiently large to achieve a determined precision in the target TXOP value.

4. The method of claim 2, wherein the beacon is part of an IEEE 802.11 standard Media Access Control (MAC) superframe that includes the beacon, a contention-free period (CFP) for offloaded cellular traffic, and a contention period (CP) for local WiFi traffic.

5. The method of claim 1 further comprising receiving an association request frame from one of the users, wherein the target TXOP value is transmitted in an association response frame to the user.

6. The method of claim 5, wherein the target TXOP value is transmitted in a target TXOP information element (IE) in the association response frame.

7. The method of claim 5, wherein the association request frame includes a target TXOP information element (IE) that indicates a requested TXOP value from the user.

8. The method of claim 5, wherein the association request frame and the association response frame are exchanged during an association process to establish a session between the user and the wireless network, and wherein the assigned target TXOP value is fixed during the session.

9. The method of claim 1 further comprising receiving an Add Traffic Stream (ADDTS) request frame from one of the users, wherein the target TXOP value is transmitted in an ADDTS response frame to the user.

10. The method of claim 9, wherein the target TXOP value is transmitted in a target TXOP information element (IE) in the ADDTS response frame.

11. The method of claim 9, wherein the target TXOP value is indicated in a Traffic Specification (TSPEC) IE in the ADDTS request frame.

12. The method of claim 9, wherein the ADDTS request frame includes a target TXOP information element (IE) that indicates a requested TXOP value from the user.

13. The method of claim 9, wherein the ADDTS request frame and the ADDTS response frame are exchanged more than one time during a session between the user and the wireless network to reassign a new target TXOP value.

14. A network component for promoting various degrees of fairness for users in a wireless network, the network component comprising:
a processor; and
a non-transitory computer readable storage medium storing programming for execution by the processor, the programming including instructions to:
assign a target transmission opportunity (TXOP) value to a mobile station (STA) in the wireless network, wherein the target TXOP value indicates an average number of time units over which the STA is allocated to perform transmissions during a time period, and wherein the target TXOP value allocates transmission opportunities to the STA without allocating specific time units for carrying the transmissions of the STA; and transmit the target TXOP value to the one or more users.

15. The network component of claim 14, wherein the wireless network comprises a Medium Access Control (MAC) configured for random access.

16. The network component of claim 14, wherein the wireless network is an IEEE 802.11 WiFi network.

17. The network component of claim 14, wherein the target TXOP value is based on at least one of user data rate, traffic type, loading conditions, mobility patterns, and throughput.

18. The network component of claim 14, wherein different target TXOP values are assigned for different users to achieve different levels of fairness.

19. The network component of claim 14, wherein the target TXOP value is assigned to achieve proportional fairness (PF) among a plurality of users.

20. The network component of claim 14, wherein the target TXOP value is assigned to achieve maximum minimum (max-min) fairness among a plurality of users.

21. A method for supporting various degrees of fairness in a wireless network, the method comprising:

receiving, by a mobile station (STA), a target transmission opportunity (TXOP) value from the wireless network, wherein the target TXOP value indicates an average number of time units over which the STA is allocated to perform transmissions during a time period, and wherein the target TXOP value allocates transmission opportunities to the STA without allocating specific time units for carrying the transmissions of the STA; and transmitting traffic over a plurality of time periods that have an average duration about equal to the number of time units.

22. The method of claim 21, wherein transmitting traffic comprises transmitting less traffic during at least one of the time periods that has a duration less than the number of time units.

23. The method of claim 21, wherein transmitting traffic comprises transmitting more traffic during at least one of the time periods that has a duration greater than the number of time units.

24. A device supporting various degrees of fairness in a wireless network, the device comprising:

a processor; and a non-transitory computer readable storage medium storing programming for execution by the processor, the programming including instructions to:

receive a target transmission opportunity (TXOP) value from the wireless network, wherein the target TXOP value indicates an average number of time units over which the STA is allocated to perform transmissions during a time period, and wherein the target TXOP value allocates transmission opportunities to the STA without allocating specific time units for carrying the transmissions of the STA; and transmit traffic over a plurality of separate time periods that are on average about equal to the number of time units.

* * * * *